Nov. 14, 1961 R. W. ANNONIO 3,008,848
ADHESIVE RESIN PRIMER COMPOSITION, METHOD OF BONDING
A SYNTHETIC RESIN TO A BASE THEREWITH
AND ARTICLE PRODUCED THEREBY
Filed Feb. 16, 1959

TOP COATING OF A SYNTHETIC RESIN

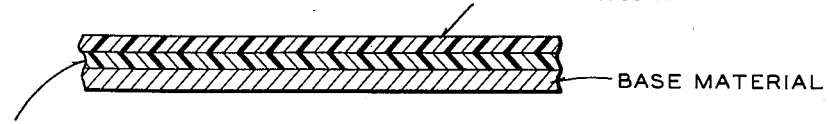

BASE MATERIAL

PRIMER COATING OF A DIGLYCIDYL ETHER
OF A DIHYDRIC PHENOL, A HARDENER,
A PHENOL-FORMALDEHYDE RESIN AND
AN ACRYLIC ACID ESTER POLYMER.

INVENTOR

R. W. ANNONIO

BY James C. Crumbs
ATTORNEY 3,008,848
ADHESIVE RESIN PRIMER COMPOSITION, METHOD OF BONDING A SYNTHETIC RESIN TO A BASE THEREWITH AND ARTICLE PRODUCED THEREBY
Raffaele W. Annonio, Plainfield, N.J., assignor to Union Carbide Corporation, a corporation of New York
Filed Feb. 16, 1959, Ser. No. 793,240
26 Claims. (Cl. 117—72)

This invention relates to improving the adhesion of resins and resin compositions to a substrate and to composite articles resulting therefrom. More specifically, this invention relates to a composition which has particular utility as a primary coat or primer for effecting the adhesion of thermoplastic and thermosetting resins and compositions based thereon to a smooth, hard, non-absorbent surface such as metal or glass.

Heretofore, the poor adhesion of passive resins such as polyvinyl chloride to smooth, hard, non-absorbent surfaces has considerably limited the scope of usefulness of such resins in coating and surfacing applications. "Passive" resins do not contain highly polar groups which could set-up a strong electrostatic union with the surfaces of the substrate to which they have been applied. As an example, the adhesion of a vinyl chloride resin to a metal or glass surface depends upon mechanical factors, i.e., the presence of rough or porous areas on the surface of the substrate into which the resin can penetrate to form teeth or anchors. Such mechanical adhesion, however, has been found to be unsatisfactory as the adhesive bond between the resin and the substrate to which it has been applied is generally weak. For instance, when a vinyl chloride resin organosol is coated onto a metal surface and dried, the shrinkage in the coating occasioned by the evaporation of solvents or thinners therefrom tends to disrupt the mechanical adhesion between the coating and the substrate thereby severely weakening the adhesive bond therebetween.

Various expedients have, therefore, been proposed in order to improve the adhesion of resins and resin compositions to various substrates. Of the various expedients proposed, the use of a primary coat or primer has proved to be most desirable. The use of a primary coat or primer has allowed the coating of various types of substrates by resins and resin compositions which previously lacked the adhesive qualities necessary in order to be retained on the surface of the substrate.

It has been found, however, that of the many compositions which have been proposed as primary coats or primers, none has met the necessary requirements for a truly satisfactory and commercially attractive primer of effecting excellent adhesion between the resin top coat and the substrate without the requirement that the top coat be of a special formulation and/or that the primer itself be applied onto the substrate to a critical thickness depending upon the type of top coat which is to be applied and of maintaining excellent adhesion between the top coat and the substrate even after exposure to boiling water, high humidity, or the corrosive action of salt or common household detergents.

According to the present invention, a primary coat or primer is provided which, when applied to smooth, hard, non-porous surfaces such as glass, tin, aluminum sheet, or steel and baked thereon, will yield a strongly adherent film to which thermoplastic and thermosetting resins and compositions based thereon will strongly adhere, as is shown in accompanying drawing, and will so remain when subjected to boiling water, high humidity, salt spray, or to a household detergent.

The primers of this invention do not require a specially formulated top coat and can be applied onto the substrate as thin as 0.2 mil and still effect excellent adhesion between the top coat and substrate.

Moreover, the compositions of the present invention are thermally stable at temperatures in excess of 300° C. and are therefore highly desirable for use as primary coats or primers in effecting the adhesion of vinyl chloride resins and the like to a substrate by means of the highly attractive fluidized bed coating method described in United States Patent 2,844,489 to Erwin Gemmer, issued July 22, 1958.

The compositions of this invention comprise a blend of from about 0.5 to about 75 parts by weight of a low molecular weight diglycidyl ether of a dihydric phenol; from about 0.4 to about 12 parts by weight of a heat-reactive, alkaline catalyzed phenol-formaldehyde resin; from about 0.4 to about 7 parts by weight of a hardener; and from about 1 to about 40 parts by weight of an acrylic acid ester polymer.

Particularly desirable compositions for purposes of this invention are those comprising from about 1.8 to about 16 parts by weight of a low molecular weight diglycidyl ether of a dihydric phenol; from about 2 to about 8 parts by weight of a heat-reactive, alkaline catalyzed phenol-formaldehyde resin; from about 1.2 to about 4 parts by weight of a hardener; and from about 6 to about 20 parts by weight of an acrylic acid ester polymer. A composition having the above noted formulation has optimum qualities for effecting adhesion between a top coat and a substrate.

Parts by weight as used in this specification and appended claims are based on 100 parts by weight of an organic solution of the compositions of the present invention.

The diglycidyl ethers of dihydric phenols which are suitable for purposes of this invention are generally made by reacting epichlorohydrin with a dihydric phenol such as p-dihydroxybenzene, o-dihydroxybenzene, bis(p-hydroxyphenyl)methane, 2,2-bis(p-hydroxyphenyl)propane and the like to produce a liquid resin having a calculated molecular weight of not in excess of about 800.

A detailed description as to the preparation of diglycidyl ethers of dihydric phenols is disclosed in United States patent to Bender et al., 2,506,486, which is incorporated by reference. By way of illustration with respect to the preparation of diglycidyl ethers of dihydric phenols, 228 parts (1 mole) of 2,2-bis(p-hydroxyphenyl) propane is dissolved in a mixture containing 800 parts of water, 80 parts (2 moles) of sodium hydroxide, and 400 parts of ethanol, and the resulting solution added to a mixture of 400 parts (4.31 moles) of epichlorohydrin in 400 parts of ethanol, at a temperature of 50° C. Preferably the diphenol is added to the epichlorohydrin in such fashion that the epichlorohydrin is maintained in excess during the reaction. The reaction mixture is then heated at a temperature of 80° C. for a period of about an hour. Excess epichlorohydrin and alcohol solvent are removed from the reaction mixture, as by distillation, and the residue thus obtained may be dissolved in benzene and washed successively with caustic solution and water to remove the chloride salt and other water-soluble impurities. The glycidyl ether of 2,2-bis(p-hydroxyphenyl) propane which remains as a somewhat impure residue product upon removal of the benzene, may be purified by distillation, if desired, collecting it as a fraction boiling at 230° C. to 270° C., at a reduced pressure of 0.5 to 0.7 millimeter of mercury, or at 150° C. in a molecular still at 10 mm. pressure.

A preferred glycidyl ether for the purposes of this invention has the general formula:

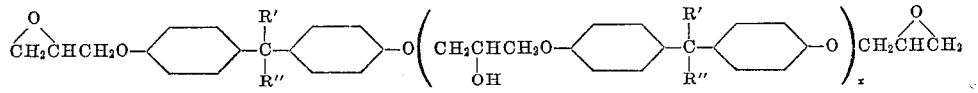

where $x=0-1$, R' and R'' are alkyl groups, preferably having up to 6 carbon atoms or hydrogen atoms and can be the same or different.

The term "phenol-formaldehyde resin" as it is employed herein is intended to embrace those resins prepared using an alkaline catalyst such as ammonia, hexamethylenetetramine, sodium hydroxide, or sodium carbonate in an amount from about 2 percent to 6 percent by weight based on the weight of the phenol. The molar ratio of phenol to formaldehyde will vary from about 0.75 to 1.4 and the phenol may be in part (usually up to about 20 percent by weight) or entirely replaced by a substituted phenol or mixtures thereof, as for example, para-cresol, para-tertiarybutyl phenol, para-amylphenol, para-phenyl phenol, 3-methyl phenol (m-cresol), 2-methyl phenol (o-cresol), 2-phenyl phenol (o-phenyl phenol), 2-isopropyl phenol, 2-tert. butyl phenol, or 2-sec. amyl phenol. The resulting heat-reactive resin is a hard, brittle substance soluble in ketone solvents, with a gel time of about 65 to 180 seconds at 150° C.

For a detailed discussion of heat-reactive, alkaline catalyzed phenol-formaldehyde resins and methods for the production thereof, reference is made to the following books which are herewith incorporated by reference: "Phenoplasts" by T. S. Carswell, Interscience Publishers, 1947, and "Chemie der Phenol Harze" by K. Hultzoh, Springer Verlay, 1950.

Any of the conventional hardeners for curing or hardening polyglycidyl ethers of polyhydric phenols which do not adversely affect the adhesive effecting qualities of the compositions of this invention can be used to harden the compositions to a hard, infusible, insoluble state.

Illustrative of suitable hardeners are the following: primary and secondary amines such as methylamine, ethylamine, n-propyl amine, n-butylamine, ethylene diamine, diethylamine, di-n-propylamine, trimethylene diamine, tetraethylene pentamine, pentamethylene diamine, hexamethylene diamine, 3-amino-butyl-6-amino octane, 1,10-diamino dodecane, 1,4-diamino-5,8-diethyl dodecane, 1,4,6-triamino decane, 1,8-diamino-6-dodecane; hydroxylated polyamines such as N-hydroxyethyl ethylene diamine, N-hydroxypropyl tetramethylene diamine, N-hydroxyethyl diethylene triamine, N,N-dihydroxyethyl diethylene triamine, N-hydroxypropyl diethylene triamine, N,N''-dihydroxyethyl diethylene triamine, N,N-dihydroxypropyl diethylene triamine, N,N''-dihydroxypropyl diethylene triamine, N-hydroxyethyl propylene diamine, N-hydroxypropyl propylene diamine, N-hydroxyethyl dipropylene triamine, N,N-dihydroxyethyl dipropylene triamine, N,N-dihydroxyethyl dipropylene triamine, trishydroxyethyl triethylene tetramine, and the like.

Other suitable hydroxylated polyamines and a method for their production are to be found in United States patent to Herbert A. Newey, 2,864,775, issued December 16, 1958, which is herein incorporated by reference. Amides containing up to 8 carbon atoms, such as formamide, acetamide, propionamide, butyramide, and the like; diamides such as dicyandiamide and the like; various metal halide complexes such as piperidine-borontrifluoride, monoethyl amine-boron trifluoride, ethylether-boron trifluoride, and the like; the adducts of an aliphatic nitrile and a polyamine such as described in United States Patent 2,753,323, issued to Alford G. Farnham July 3, 1956, incorporated herein by reference.

Particularly desirable hardeners for purposes of this invention are dicyandiamide and the adducts of an aliphatic nitrile such as acrylonitrile and a polyamine such as diethylene triamine. Compositions containing these hardeners have a relatively long storage life. A composition containing dicyandiamide has a storage life in excess of two months; a composition containing an adduct of an aliphatic nitrile and a polyamine has a storage life in excess of one week.

Liquid hardeners can be used as such. Solid hardeners are conveniently added as an organic solution in such solvents as dimethyl formamide and organic solvents which are noted subsequently as solvents for the primer composition itself.

Acrylic acid ester polymers as used herein refers to acrylic acid ester homopolymers such as those produced by polymerizing a lower alkyl acrylic acid ester such as methyl acrylate, ethyl acrylate, propyl acrylate, amyl acrylate, isopropyl acrylate, butyl acrylate, hexyl acrylate, 2-ethyl hexyl acrylate, octyl acrylate, and other lower alkyl acrylates wherein the alkyl group contains up to 8 carbon atoms, also copolymers thereof with methyl methacrylate wherein the alkyl acrylate combined therein is at least about 40 percent by weight, blends thereof, or blends of acrylic acid ester polymers with a methyl methacrylate polymer. Methods of producing acrylic acid ester polymers are described in detail in a book by E. H. Riddle, entitled "Monomeric Acrylic Esters," published in 1954 by the Reinhold Publishing Co., and United States patent to Carl T. Kautter, 2,250,485, which are incorporated by reference.

Among the more important commercially available acrylic acid ester polymers suitable for purposes of this invention are those manufactured by the Rohm and Haas Co. and made available under the trade designation Acryloid A–10 and Acryloid A–101.

Acryloid A–10 is predominantly a methyl methacrylate polymer, dissolved in Cellosolve having the following physical properties: specific gravity, 1.03; viscosity at 30°, 710–850 centipoises; flash point, 118° F.

Acryloid A–101 is predominantly a methyl methacrylate polymer, dissolved in methyl ethyl ketone, having the following physical properties: specific gravity, 0.94; viscosity at 30°, 700–1500 centipoises; flash point 22° F.

The compositions of the present invention are generally dissolved in an organic solvent vehicle and conveniently applied as such. Suitable solvents include among other ketones, for example acetone, methyl ethyl ketone, methylisobutyl ketone, diisobutyl ketone, isophorone, methyl isophorone, nonanone, cyclohexanone, epoxy acetone, butoxy acetone, and the like. Lower alkyl esters such as methyl acetate, ethyl acetate, propyl acetate, butyl acetate, and the like are suitable. Other suitable solvents are dioxane, Cellosolve, butyl Cellosolve, butyl Cellosolve acetate, butyl Carbitol acetate, Cellosolve acetate, the lower aliphatic alcohols such as ethanol, propanol, and the like; the nitroparaffins such as 2-nitropropane and nitroethane; the aromatic hydrocarbons, such as toluene, benzene, xylene, trimethyl benzene, and the like; the aliphatic hydrocarbons, such as heptane, petroleum hydrocarbons, and the like.

The solvents or mixtures thereof are chosen so that all the components of the compositions remain compatible and in solution. It is generally preferred to use Carbitol as an organic solvent for the coating compositions, generally in admixture with one or more of other organic solvents. The presence of Carbitol insures that all of the components of the coating composition will remain compatible and in solution. The actual amount of solvent used will depend upon the particular method by which the primer coat is to be applied. The organic solvent can be present in an amount up to about 90 percent by weight based on the total weight of the primer coat solution.

Components of the composition of this invention are blended in the desired proportions preferably just prior to their application although in some instances, depending upon the hardener, they can be stored for as long as a month or more without any deleterious effect. The compositions can be applied to a substrate by any of the conventional methods of dipping, spraying, knife coating, and the like. Once applied, they can be baked immediately or air dried and then baked at appropriate temperatures to a hard, infusible, insoluble state. The time and temperature of the heating cycle will depend upon the actual formulation of the composition. It is preferred to bake or heat the compositions once applied to a substrate such as steel, for about 3 minutes at 205° C. or 5 minutes at 180° C. Once heated the compositions yield a thermally stable coating. Higher baking temperatures can be used, up to about 300° C. without any detrimental effects occurring to the coating.

The compositions of the present invention can be used as a primary coat or primer to effect adhesion of both thermoplastic and thermosetting resins. For example, vinyl chloride resins and compositions thereof such as plastisols and organosols have excellent adhesion to substrates when primed by the compositions of this invention.

By the term vinyl chloride resin as used herein is meant vinyl chloride polymers and vinyl chloride copolymers, wherein the vinyl chloride is copolymerized with other ethylenically unsaturated compounds, provided said copolymers contain at least about 50 percent by weight of vinyl chloride. Ethylenically unsaturated compounds which can be copolymerized with vinyl chloride include vinylidene halides such as vinylidene chloride and vinylidene bromide; vinyl esters such as vinyl acetate, vinyl proprionate, vinyl butyrate, vinyl chloroacetate, vinyl chloropropionate, vinyl stearate, vinyl chlorobenzoate; acrylic and alpha-alkyl acrylic acids, their alkyl esters, their amides, and their nitriles such as acrylic acid, chloroacrylic acid, methacrylic acid, ethacrylic acid, methyl acrylate, ethyl acrylate, butyl acrylate, n-octyl acrylate, 2-ethyl hexyl acrylate, n-decyl acrylate, methyl methacrylate, ethyl ethacrylate, acrylamide, N-methyl acrylamide, N,N - di - methylacrylamide, methacrylamide, N-methyl methacrylamide, N,N-dimethyl methacrylamide, acrylonitrile, chloroacrylonitrile, methacrylonitrile, ethacrylonitrile; vinyl aromatic compounds such as styrene, dichlorostyrene, vinyl naphthalene; alkyl esters of maleic and fumaric acid such as dimethyl maleate, dibutyl maleate; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone; also vinyl pyridine, N-vinyl carbazole, N-vinyl pyrrolidene, ethyl methylene malonate, isobutylene, ethylene, trichloroethylene and various other ethylenically unsaturated compounds. Mixtures of the above can also be polymerized as is well known in the art.

By the term vinyl chloride resin plastisols is meant those dispersions, preferably of extremely small, essentially spherical ultimate particles of 0.1 to 20 microns ultimate diameter, that require at least 25 parts to 200 parts by weight of plasticizer to each 100 parts by weight of resin, to impart suitable flexibility thereto. Such resins are those having an intrinsic viscosity in cyclohexanone at 20° C. of at least about 1.25 or more. For example, vinyl chloride resins having an intrinsic viscosity of 1.52 in cyclohexanone at 20° C. are thoroughly operative.

The term vinyl chloride resin organosol indicates a plastisol composition as described above to which a volatile non-aqueous liquid diluent and/or dispersant is added. The basic relationship of proportions between resin and plasticizer is not affected. The amount of volatile ingredient used is generally from about 3 percent to approximately 60 percent by weight of the total composition.

Suitable plasticizers for these vinyl chloride resins are 2,2'-(2-ethylhexamide) diethyl di(2-ethylhexoate), polyethylene glycol di(2-ethylhexoate), triethylene glycol di-2-ethylhexoate, tri(2-ethylhexyl)phosphate, dioctyl ester of dicarboxylic acid, di-2-ethylhexyl adipate, diethylene glycol dibenzoate, tricresyl phosphate, partially hydrogenated isomeric terphenyls and alkylated derivatives thereof, bis(dimethylbenzyl) carbonate, dioctyl sebacate, and polyesters and epoxidized polyesters prepared from fatty acids with dibasic acids. Preferred as plasticizers, of course, are those compounds which are particularly resistant to the effects of high baking temperatures, such as for example, di-(2-ethylhexyl) phthalate, di(2-amyl) phthalate, dibutyl phthalate, diisooctyl phthalate, di(n-hexyl) phthalate, butyl benzyl phthalate, and the phthalates of mixed octanols.

The volatile liquid phase in organosols comprises a non-polar diluent and a polar dispersant. The dispersants employed are usually ketones and esters. Illustrative of the ketones are those solvents disclosed hereinabove for use with the primer composition. Typical esters which, in general, make the most desirable dispersants are di-2-ethyl hexyl phthalate and tricresyl phosphate. Nitroparaffins, such as nitroethane and 2-nitropropane and ether-alcohols, are also useful in this regard. The non-polar diluents are aliphatic and aromatic hydrocarbons, such as for example, benzene, toluene, xylene, heptane, octane, cyclohexane, and petroleum hydrocarbons.

Other suitable thermoplastic resins include polypropylene, polyethylene, and the like, particularly polyethylene having a density of 23° C. (ASTM D–71–27) of from about 0.91 to about 0.98 and a melt index (ASTM D–123–52T) from about 0.2 to about 20.

Illustrative of thermosetting resins are the heat-reactive alkaline catalyzed phenol-formaldehyde resins previously described, as well as acid catalyzed phenol-formaldehyde novolak resins, the alkyd resins such as described in Ellis, vol. II, Chemistry of Synthetic Resins, chapter 47, polyepoxides such as those having the formula:

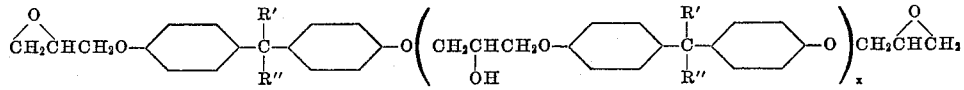

wherein $x$ has a value of from 0 to 20 and R' and R" are described previously.

The top coat can also be applied by conventional coating operations such as dipping, spraying, knife coating, or by the fluidized bed coating technique, or as by casting.

To further indicate the excellent properties of the compositions of this invention, particularly when used as a primer, steel panels 3 inches wide and 5 inches long were coated with the primer and a top coat applied thereto. The exact formulation of the primer and top coat are noted in the examples which are for purposes of illustrating this invention. The test to which the coated panels were subjected are described below.

INITIAL ADHESION

Two parallel knife slits about 3/16 inch apart were made through the top coat and primer to the base. A third knife slit penetrating to the substrate was made at one end of the parallel slits and perpendicular thereto. A knife edge was then dug into the latter slit and a small section or lip of the top coat freed from the panel . . . . A very slow and steady pull was then exerted manually on the freed lip in an attempt to strip the top coat located between the parallel slits from the panel. From the difficulty encountered in stripping the top coat from the panel in the manner described, ratings of the adhesion promoting qualities of the primer were made as follows:

Excellent—top coat snapped; no stripping possible
Very good—top coat was stripped only slightly before snapping
Good—top coat was stripped but only with difficulty
Fair—top coat was stripped off by means of a moderate but steady pull
Poor—top coat was stripped off with but slight resistance
Very poor—top coat was stripped off with no resistance.

ADHESION 24 HOURS AFTER APPLYING THE TOP COAT

Tests for determining the adhesion promoting qualities of the primer 24 hours after the top coat was applied were conducted and ratings made in a manner described under Initial Adhesion.

ADHESION AFTER EXPOSURE TO HIGH HUMIDITY

Panels were placed in so-called humidity boxes wherein the temperature was between 45°–50° C. and the relative humidity was 100 percent. Adhesion promoting qualities of the primer were tested for and ratings made in accordance with the procedures described under Initial Adhesion. The actual time each panel remained in the humidity box is noted in the examples of this specification.

SALT SPRAY TEST

Coated panels were slit X fashion through the top coat and primer to the base and placed in a closed box for 100 hours wherein there was maintained a 5 percent by weight aqueous salt spray mist. Loss of adhesion at the knife slits was measured by gently picking at the top coat along the knife slits and measuring to what distance out from the knife slits loss of adhesion of the top coat had occurred.

ADHESION IMMEDIATELY FOLLOWING IMMERSION IN BOILING WATER

Coated panels were slit for this test in the same manner as in the initial Adhesion test. After a small section or lip of the top coat had been freed from the panel, the panel was immersed in boiling water, removed, and a steady pull exerted on the freed lip. The time elapsed between removal from the boiling water and the development of resistance to the pull is noted as the recovery time. The ratings as to the amount of resistance are the same as those noted in the Initial Adhesion test.

TIDE TEST

This test is conducted by immersing a coated steel panel into a 1 percent by weight aqueous solution of Tide detergent, maintained at 70° C. The coated steel panel is allowed to remain immersed until it is determined visually that the coating has blistered, delaminated, or discolored. The time it takes for the coating to blister, delaminate, or discolor is noted and the test is considered at an end. If no deleterious effects are incurred by the coating after 10 hours, the coating is stated to have excellent resistivity to household detergents.

"Tide" is the trade name for a synthetic detergent and wetting agent which is marketed by the Procter & Gamble Distributing Co. "Tide" is packaged and sold in the form of a white powder, is characterized by a high foam value and chemically is a sodium lauryl sulfonate.

Example I

A primary coat or primer composition in an organic solvent was prepared by blending the following components by means of an air stirrer:

| | Parts by weight |
|---|---|
| (1) Acryloid A–101 as a 40% by weight methyl ethyl ketone solution | 25 |
| (2) ERL–2774 [1] | 10 |
| (3) Phenol-formaldehyde resin as a 37.7% by weight methyl ethyl ketone solution | 8.65 |
| (4) Dicyandiamide as a 15% by weight dimethyl formamide solution | 8.0 |
| (5) Cyclohexanone | 20 |
| (6) Methyl isobutyl ketone | 18.35 |
| (7) Carbitol | 10 |

[1] A glycidyl ether manufacture by the Plastics Co. of Union Carbide Corporation, New York, N.Y., in which the value of $x$ is about 0.15.

The phenol-formaldehyde resin employed was prepared by reacting, at 80° C. for about 1¼ hours, 100 parts by weight (1 mole) of a commercial phenol (80 percent by weight phenol–20 percent by weight o-cresol) with 61.6 parts by weight (¾ mole) formaldehyde (37 percent) and 2.40 parts by weight hexamethylene tetramine. The resultant resin was dehydrated to a residue temperature of 100°–105° C. under 27″ vacuum, discharged into pans and cooled to room temperature, about 23° C. A sample of this resin, when heated at 150° C. for 70–80 seconds, gelled to an infusible, insoluble product. Resin has a ring and ball softening point of 80–100° C.

The phenolic and acrylate solutions were combined and epoxy resin added thereto. The solution was diluted with cyclohexanone, methyl isobutyl ketone, and carbitol, and the hardener added thereto.

After the formulation was thoroughly blended, it was spray coated onto a solvent cleaned 3″ x 5″ steel panel and baked for 3 minutes at 205° C. to provide the panel with an adherent film of about 0.2 to about 0.3 mil. The primed panels were then coated by a casting operation to a top coat thickness of 15 mils with a plastisol composition having the following formulation:

| | Parts by weight |
|---|---|
| (1) Polyvinyl chloride-A | 100 |
| (2) ERL–2774 stabilizer for the polyvinyl chloride | 2 |
| (3) TiO$_2$ | 20 |
| (4) Di(2-ethyl hexyl) phthalate | 16.4 |
| (5) Di-decyl phthalate | 43.6 |

The polyvinyl chloride had a specific viscosity of 0.29, a specific gravity of 1.40, and a particle size less than 10 microns.

The plastisol formulation before being applied onto the primed panel was blended in a paddle mixer to a homogeneous mixture.

Results of tests to which panels were subjected are noted below:

| Test | Rating |
|---|---|
| Initial adhesion | Excellent. |
| 24 Hour adhesion | Do. |
| Adhesion after immersion in boiling water for 4 hours. | After recovery time of 20 seconds adhesion was excellent. |
| Salt spray resistance: | |
| 50 hours | No loss of adhesion, i.e. no creepback. |
| 118.5 hours | No loss of adhesion. |
| 200 hours | Creepback ½₂″. |
| 293 hours | Do. |
| 388.1 hours | Creepback ⅟₁₆″. |
| 505.2 hours | Do. |
| 619.2 hours | Do. |
| 710.2 hours | Do. |

The data above clearly indicates that the primers of this invention effect excellent adhesion between a substrate and a top coat.

Example II

A steel panel was primed with the coating composition and by the procedure described in Example I.

The primed steel panel was coated to a top coat thickness of 15 mils by a casting operation with a plastisol having the following formulation:

| | Parts by weight |
|---|---|
| (1) Polyvinyl chloride-A | 55 |
| (2) Polyvinyl chloride-B | 45 |
| (3) Calcined clay | 15 |
| (4) Butyl butoxy phthalate | 60 |
| (5) Cadmium-barium laurate | 2 |

Polyvinyl chloride-B has a specific viscosity of 1.41, a specific gravity of 4.40, and a particle size of 5–10 microns. Panels were tested and rated as indicated below:

| Test | Rating |
|---|---|
| Initial adhesion | Excellent. |
| 24 Hour adhesion | Do. |
| Adhesion after immersion in boiling water for 4 hours. | After recovery time of 90 seconds adhesion was excellent. |

*Example III*

A steel panel was primed with the coating composition and by the procedure described in Example I.

The primed steel panel was coated to a top coat thickness of 15 mils by a casting operation, with a plastisol having the following formulation:

| | Parts by weight |
|---|---|
| (1) Polyvinyl chloride-A | 55 |
| (2) Polyvinyl chloride-B | 45 |
| (3) Calcined clay | 15 |
| (4) Tributyl citrate | 60 |

| Test | Rating |
|---|---|
| Initial adhesion | Excellent. |
| 24 Hour adhesion | Do. |
| Adhesion after immersion in boiling water for 4 hours. | After recovery time of 60 seconds adhesion was excellent. |

*Example IV*

A primary coat or primer composition in an organic solvent was prepared by blending the following components with an air stirrer:

| | Parts by weight |
|---|---|
| (1) Acryloid A-101 | 40 |
| (2) ERL-2774 | 10 |
| (3) Phenol-formaldehyde resin as a 37.7% by weight methyl ethyl ketone solution | 8.65 |
| (4) Adduct of diethylene triamine and acrylonitrile (described in U.S.P. 2,753,323) | 4.0 |
| (5) Cyclohexanone | 20.55 |
| (6) Carbitol | 16.80 |

The primed panel was top coated to a thickness of 15 mils with a plastisol whose formulation is described in Example I by a conventional casting operation. Panels were tested and rated as indicated below.

| Test | Rating |
|---|---|
| Initial adhesion | Excellent. |
| 24 Hour adhesion | Do. |
| Adhesion after immersion in boiling water for 4 hours. | Immediate recovery, adhesion was excellent. |
| Salt spray resistance: | |
| 50 hours | No loss of adhesion. |
| 118.5 hours | Do. |
| 200 hours | Creepback barely detectable. |
| 293 hours | Creepback 1/64". |
| 388.1 hours | Creepback 1/16". |
| 505.2 hours | Do. |
| 619.2 hours | Do. |
| 710.2 hours | Do. |

The salt spray resistance of the primer was excellent.

*Example V*

A steel panel was primed with the coating composition and by the procedure described in Example IV.

The primed steel panel was coated with the plastisol and by the procedure described in Example II, tested and rated.

| Test | Rating |
|---|---|
| Initial adhesion | Excellent. |
| 24 Hour adhesion | Do. |
| Adhesion after immersion in boiling water for 4 hours. | After recovery time of 10 seconds adhesion was excellent. |

*Example VI*

A steel panel was primed with the coating composition and by the procedure described in Example IV.

The primed steel panel was coated with the plastisol and by the procedure described in Example III.

| Test | Rating |
|---|---|
| Initial adhesion | Excellent. |
| 24 Hour adhesion | Do. |
| Adhesion after immersion in boiling water for 4 hours. | After recovery time of 30 seconds adhesion was excellent. |

*Example VII*

A hot rolled steel panel 2" wide, 5½" long and ¾" thick was coated to a thickness of 0.3 mil by a dip coating operation with the primer composition described in Example I. The primed panel was allowed to dry at room temperature and was then heated at 300° C. for 5 minutes. The hot panel was immersed in fluidized bed of a polyvinyl chloride resin composition for 15 seconds whereby the panel picked up a top coating of 5–10 mils thick. The panel was then heated for 50 seconds at 300° C. and quenched in water (23° C.). Panel was tested and rated as indicated below.

| Test | Rating |
|---|---|
| Initial adhesion | Excellent. |
| 24 Hour adhesion | Do. |
| Adhesion after immersion in boiling water for 3½ hours. | Immediate recovery, excellent adhesion. |

The polyvinyl chloride resin composition had the following formulation:

| | Parts by weight |
|---|---|
| (1) Polyvinyl chloride specific viscosity 1.4–1.5 | 56.7 |
| (2) Di-(2-ethyl hexyl)phthalate | 32.3 |
| (3) Cadmium ricinoleate | 1.0 |
| (4) Dibutyl tin dilaurate | 1.0 |
| (5) Calcium carbonate | 5.0 |
| (6) Paraplex G-60 | 4 |

Paraplex G-60 is an epoxidized soy bean oil having the following properties as enumerated in a booklet published by the Rohm and Haas Co. entitled "Plasticizers":

| | |
|---|---|
| Molecular weight (number average) | 1000 |
| Color (Gardner varnish scale) | 2 (max.) |
| Specific gravity, 25°C./15° C. | 0.990 |
| Viscosity (poises at 25° C.) | 2 to 3 |
| Freezing point (° C.) | 0 to +5 |
| Acid number, mgm. KOH/gm | 1.0 max. |

Particle size of the vinyl chloride resin composition was 40 mesh.

*Example VIII*

Rolled steel panels and aluminum panels each 2" wide, 5½" long and ¾" thick were coated with the primer composition and by the procedure described in Example VII. The coated panels were subjected to baking and subsequent preheating temperatures noted in the table below. The panels were coated with a top coat of a polyvinyl chloride resin in a manner described in Example VII. Panels were tested and rated as indicated below. Vinyl chloride resin composition used in this example was the same as that of Example VII. The recovery time of the primer when subjected to the boiling water test was immediate.

| Substrate | Time and temperature at which primer was baked | Time and Temperature at which primed panels were pre-heated | Initial Adhesion | Adhesion after immersion in boiling water for 10 minutes. Adhesion tested 30 sec. after removal from water | Humidity, Affect on adhesion | |
|---|---|---|---|---|---|---|
| | | | | | Time Exposed, days | Adhesion |
| Aluminum | 5 min. at 177° C | 2 min. at 275° C | Excellent | Excellent | 21 | Excellent. |
| Steel | do | do | do | do | 21 | Do. |
| Aluminum | do | 5 min. at 300° C | do | do | 21 | Do. |
| Steel | do | do | do | do | 21 | Do. |
| Aluminum | no baking | do | do | do | | |
| Steel | do | do | do | do | | |

*Example IX*

Two steel panels of the type described in Example VIII were primed with the coating composition described in Example I. One primed panel was then coated with polyethylene, the other primed panel with an epoxy resin. The top coatings were applied to a final thickness of 6–8 mils using the fluidized bed coating procedure.

The polyethylene used had a density of 0.98, a melt index of 1.5–2.5 and a particle size of 40 mesh. The epoxy resin was a polyglycidyl ether of 2,2-bis(p-hydroxyphenyl) propane having a calculated molecular weight of about 3400–3500 and a particle size of about 100 mesh.

The time and temperatures to which the panels were subjected are noted below, as are the tests and ratings thereto.

| Type of top coat | Time and temperature at which primed panels were preheated prior to application of each top coat layer | Number of layers applied | Heating time between layers, min. | Time and temperature at which panels were heated after final layer was applied |
|---|---|---|---|---|
| Polyethylene | 3 min. at 210° C | 3 | ½ | 8 min. at 210° C. |
| Epoxy | 5 min. at 185° C | 2 | 1 | 45 min. at 185° C. |

| Top Coat | Test | Adhesion |
|---|---|---|
| Polyethylene | Tide test immersion for 16 hrs. | Excellent. |
| Do | Boiling water immersion for 10 hrs. | Excellent, Immediate Recovery. |
| Epoxy | Tide test immersion for 16 hrs. | Excellent. |
| Do | Boiling water immersion for 9 hrs. | Very good, Immediate Recovery. |

For purposes of comparison, panels were prepared in the same manner described above with the exception that they were not primed. Such panels exhibited poor adhesion both with respect to the polyethylene and the epoxy when subjected to the Tide test and Boiling Water test.

Specific viscosity measurements noted herein were made on solutions containing 0.2 gram of resin per 100 ml. of cyclohexanone, at room temperature (about 23° C.)

Calculated molecular weight values for the epoxy compounds can be conveniently determined from the epoxy equivalency thereof. Determination of epoxy equivalency can be made according to the procedure described in United States Patent 2,633,458, issued to Edward C. Shokal.

Composite articles produced in accordance with this invention can be shaped into various articles such as bottle caps, bottles, appliance cabinets, and the like.

What is claimed is:

1. Method of producing a coated structure which comprises applying onto a substrate a primer composition, in an organic solvent, comprising from about 0.5 to about 75 parts by weight of a low molecular weight diglycidyl ether of a dihydric phenol; from about 0.4 to about 12 parts by weight of a heat-reactive, alkaline catalyzed phenol-formaldehyde resin; from about 0.4 to about 7 parts by weight of a hardener for said diglycidyl ether; and from about 1 to about 40 parts by weight of an acrylic acid ester polymer, heating said primer composition to provide a substrate with an adherent film and applying a synthetic resin top coat onto said adherent film.

2. Method as defined in claim 1 wherein the primer composition comprises from about 1.8 to about 16 parts by weight of a low molecular weight diglycidyl ether of a dihydric phenol; from about 2 to about 8 parts by weight of a heat-reactive, alkaline catalyzed phenol-formaldehyde resin; from about 1.2 to about 4 parts by weight of a hardener for said diglycidyl ether; and from about 6 to about 20 parts by weight of an acrylic acid ester polymer.

3. Method as defined in claim 1 wherein the organic solvent contains Carbitol.

4. Method as defined in claim 1 wherein the top coat is a vinyl chloride resin.

5. Method as defined in claim 1 wherein the top coat is polyethylene.

6. Method as defined in claim 1 wherein the top coat is an epoxy resin.

7. A primer composition comprising from about 0.5 to about 75 parts by weight of a low molecular weight diglycidyl ether of a dihydric phenol; from about 0.4 to about 12 parts by weight of a heat-reactive, alkaline catalyzed phenol-formaldehyde resin; from about 0.4 to about 7 parts by weight of a hardener for said diglycidyl ether; and from about 1 to about 40 parts by weight of an acrylic acid ester polymer.

8. A primer composition as defined in claim 7 wherein the hardener is dicyandiamide.

9. A primer composition as defined in claim 7 wherein the diglycidyl ether is diglycidyl ether of 2,2-bis(p-hydroxyphenyl)propane.

10. A primer composition as defined in claim 7 wherein the hardener is an adduct of an aliphatic nitrile and a polyamine.

11. A primer composition as defined in claim 10 wherein the hardener is an adduct of acrylonitrile and diethylene triamine.

12. A composition as defined in claim 7 wherein the acrylic acid ester polymer is a methyl methacrylate polymer.

13. The infusible product of the composition defined in claim 7.

14. A primer composition comprising from about 1.8 to about 16 parts by weight of a low molecular weight diglycidyl ether of a dihydric phenol; from about 2 to about 8 parts by weight of a heat-reactive, alkaline catalyzed phenol-formaldehyde resin; from about 1.2 to about 4 parts by weight of a hardener for said diglycidyl ether; and from about 6 to about 20 parts by weight of an acrylic acid ester polymer.

15. The infusible product of the composition defined in claim 14.

16. A primer composition comprising from about 0.5 to about 75 parts by weight of a diglycidyl ether of a dihydric phenol having the formula:

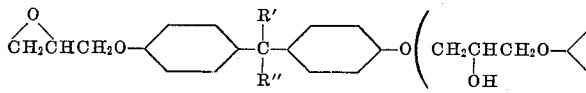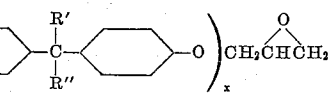

wherein $x=0-1$, R' and R" are members of the group selected from hydrogen atoms and alkyl groups; from about 0.4 to about 12 parts by weight of a heat-reactive, alkaline catalyzed phenol-formaldehyde resin; from about 0.4 to about 7 parts by weight of a hardener for said diglycidyl ether; and from about 1 to about 40 parts by weight of an acrylic acid ester polymer.

17. The infusible product of the composition defined in claim 16.

18. A primer composition as defined in claim 16 wherein: the diglycidyl ether is present in an amount of from about 1.8 to about 16 parts by weight; the heat-reactive, alkaline catalyzed phenol-formaldehyde resin is present in an amount of from about 2 to about 8 parts by weight; the hardener for the said diglycidyl ether is present in an amount of from about 1.2 to about 4 parts by weight; and the acrylic acid ester polymer is present in an amount of from about 6 to about 20 parts by weight.

19. The infusible product of the composition defined in claim 18.

20. A primer composition as defined in claim 16 wherein the acrylic acid ester polymer is a methyl methacrylate polymer.

21. The infusible product of the composition defined in claim 20.

22. A composite article comprising a substrate, a primer coating on said substrate which is the infusible product of a composition, comprising from about 0.5 to about 75 parts by weight of a low molecular weight diglycidyl ether of a dihydric phenol; from about 0.4 to about 12 parts by weight of a heat-reactive, alkaline catalyzed phenol-formaldehyde resin; from about 0.4 to about 7 parts by weight of a hardener for said diglycidyl ether; and from about 1 to about 40 parts by weight of an acrylic acid ester polymer, and a synthetic resin top coat on said primer coating.

23. A composite article comprising a substrate, a primer coating on said substrate, which is the infusible product of a composition comprising from about 1.8 to about 16 parts by weight of a low molecular weight diglycidyl ether of a dihydric phenol; from about 2 to about 8 parts by weight of a heat-reactive, alkaline catalyzed phenol-formaldehyde resin; from about 1.2 to about 4 parts by weight of a hardener for said diglycidyl ether; and from about 6 to about 20 parts by weight of an acrylic acid ester polymer, and a synthetic resin top coat on said primer coating.

24. A composite article as defined in claim 23 wherein the top coat is a vinyl chloride resin.

25. A composite article as defined in claim 23 wherein the top coat is polyethylene.

26. A composite article as defined in claim 23 wherein the top coat is an epoxy resin.

References Cited in the file of this patent

UNITED STATES PATENTS

| | | |
|---|---|---|
| 2,687,396 | McLean | Aug. 24, 1954 |
| 2,842,459 | Gollub et al. | July 8, 1958 |
| 2,893,965 | Greenlee | July 7, 1959 |